United States Patent
Inoue et al.

(10) Patent No.: US 10,756,375 B2
(45) Date of Patent: Aug. 25, 2020

(54) ELECTROCHEMICAL REACTION UNIT CELL, AND ELECTROCHEMICAL REACTION CELL STACK

(71) Applicant: MORIMURA SOFC TECHNOLOGY CO., LTD., Komaki-shi, Aichi (JP)

(72) Inventors: Shiro Inoue, Konan (JP); Tatsuya Ono, Komaki (JP)

(73) Assignee: MORIMURA SOFC TECHNOLOGY CO., LTD., Komaki-Shi, Aichi (JP)

( * ) Notice: Subject to any disclaimer, the term of this patent is extended or adjusted under 35 U.S.C. 154(b) by 105 days.

(21) Appl. No.: 16/080,448

(22) PCT Filed: May 19, 2017

(86) PCT No.: PCT/JP2017/018758
§ 371 (c)(1),
(2) Date: Aug. 28, 2018

(87) PCT Pub. No.: WO2018/029935
PCT Pub. Date: Feb. 15, 2018

(65) Prior Publication Data
US 2019/0067723 A1    Feb. 28, 2019

(30) Foreign Application Priority Data

Aug. 9, 2016   (JP) ................................ 2016-156051

(51) Int. Cl.
*H01M 8/1246* (2016.01)
*H01M 8/02* (2016.01)
(Continued)

(52) U.S. Cl.
CPC ....... *H01M 8/1246* (2013.01); *H01M 4/8621* (2013.01); *H01M 4/8657* (2013.01);
(Continued)

(58) Field of Classification Search
CPC ............ H01M 8/1213; H01M 8/1246; H01M 8/1253; H01M 8/02; H01M 4/8621; H01M 4/8657; H01M 4/9025; H01M 4/9033

See application file for complete search history.

(56) References Cited

U.S. PATENT DOCUMENTS

2011/0195343 A1  8/2011  Watts et al.
2013/0154147 A1  6/2013  Mohanram
(Continued)

FOREIGN PATENT DOCUMENTS

JP    2004-303455 A    10/2004
JP    2015-35416 A1    2/2015
JP    2015-62176 A     4/2015

OTHER PUBLICATIONS

Nurk et al. "Mobility of Sr in Gadolinia Doped Ceria Barrier Layers Prepared Using Spray Pyrolysis, Pulsed Laser Deposition and Magnetron Sputtering Methods."; Journal of the Electrochemical Society, 162 (20 F88-F96 (published Nov. 18, 2015). (Year: 2015).*

(Continued)

*Primary Examiner* — Gregg Cantelmo
(74) *Attorney, Agent, or Firm* — Sughrue Mion, PLLC

(57) ABSTRACT

An electrochemical reaction unit cell including an electrolyte layer containing Zr, an anode disposed on one side of the electrolyte layer in a first direction, a cathode containing Sr and disposed on another side of the electrolyte layer in the first direction, and a reaction preventing layer disposed between the electrolyte layer and the cathode. The reaction preventing layer contains Zr in an amount of 0.015 wt % to 1 wt %.

6 Claims, 9 Drawing Sheets

(51) Int. Cl.
  *H01M 4/86* (2006.01)
  *H01M 4/90* (2006.01)
  *H01M 8/1213* (2016.01)
  *H01M 8/1253* (2016.01)
  *H01M 4/88* (2006.01)
  *H01M 8/2425* (2016.01)
  *H01M 8/124* (2016.01)

(52) U.S. Cl.
  CPC ....... *H01M 4/9025* (2013.01); *H01M 4/9033* (2013.01); *H01M 8/02* (2013.01); *H01M 8/1213* (2013.01); *H01M 4/881* (2013.01); *H01M 4/8828* (2013.01); *H01M 4/8882* (2013.01); *H01M 8/1253* (2013.01); *H01M 8/2425* (2013.01); *H01M 2008/1293* (2013.01); *H01M 2300/0071* (2013.01); *H01M 2300/0094* (2013.01); *Y02E 60/525* (2013.01)

(56) References Cited

U.S. PATENT DOCUMENTS

2014/0322633 A1   10/2014   Seong et al.
2016/0164108 A1   6/2016    Matsuno et al.

OTHER PUBLICATIONS

Singhal et al. "High Temperature Solid Oxide Fuel Cells: Fundamentals, Designs and Applications"; First. Ed. 2003, Elsevier (Chapter 1). (Year: 2003).*

Communication dated Jan. 2, 2020, issued by the Korean Intellectual Property Office in corresponding Korean Application No. 10-2018-7024068.

Communication dated Jan. 10, 2020, from the European Patent Office in counterpart European Application No. 17839010.0.

International Preliminary Report on Patentability dated Feb. 12, 2019 in PCT/JP2017/018758.

Written Opinion (PCT/ISA/237) dated Jul. 25, 2017 issued by the International Searching Authority in International Application No. PCT/JP2017/018758.

International Search Report (PCT/ISA/210) dated Jul. 25, 2017 issued by the International Searching Authority in International Application No. PCT/JP2017/018758.

* cited by examiner

ELECTROCHEMICAL REACTION UNIT CELL, AND ELECTROCHEMICAL REACTION CELL STACK

CROSS-REFERENCE TO RELATED APPLICATIONS

This application is a 371 of International Application No. PCT/JP2017/018758 filed May 19, 2017, which claims priority from Japanese Patent Application No. 2016-156051 filed Aug. 9, 2016.

BACKGROUND OF THE INVENTION

1. Field of the Invention

The present disclosure relates to an electrochemical reaction unit cell.

2. Description of the Related Art

A known type of a fuel cell for generating electricity by utilizing an electrochemical reaction between hydrogen and oxygen is a solid oxide fuel cell (hereinafter also referred to as a "SOFC"). A unit cell of a fuel cell (hereinafter also referred to as a "unit cell"), which is a constitutive unit of a SOFC, and includes an electrolyte layer containing a solid oxide, a cathode, and an anode such that the cathode and the anode face each other in a predetermined direction (hereinafter referred to as a "first direction") and the electrolyte layer is arranged between these electrodes. The electrolyte layer is formed so as to contain, for example, YSZ (yttria-stabilized zirconia) or ScSZ (scandia-stabilized zirconia). The cathode is formed so as to contain, for example, LSCF (lanthanum strontium cobalt ferrite) or LSM (lanthanum strontium manganese oxide).

In the unit cell, the diffusion of Sr (strontium) contained in the cathode toward the electrolyte layer and the reaction between the diffused Sr and Zr (zirconium) contained in the electrolyte layer cause the generation of $SrZrO_3$ (hereinafter referred to as "SZO"), which is a highly resistive substance. The generation of stratiform SZO in a region between the cathode and the electrolyte layer (i.e., continuous generation of SZO in a direction approximately perpendicular to the first direction) increases the electric resistance in the first direction, resulting in poor electricity generation performance of the unit cell.

In a known technique for preventing the generation of SZO, a reaction preventing layer containing, for example, GDC (gadolinium-doped ceria) is disposed between the cathode and the electrolyte layer, and the thickness of a solid solution layer generated by interdiffusion between the electrolyte layer and the reaction preventing layer around the boundary therebetween is adjusted to a predetermined level or more (see, for example, Patent Document 1). This technique effectively prevents the generation of SZO due to reaction between Sr diffused from the cathode and Zr contained in the electrolyte layer.

Patent Document 1: Japanese Patent Application Laid-Open (kokai) No. 2015-35416

3. Problems to be Solved by the Invention

The solid solution layer, which is generated by interdiffusion between the electrolyte layer and the reaction preventing layer, is a layer having a high resistance. Thus, adjustment of the thickness of the solid solution layer to a predetermined level or more increases the electric resistance in the first direction, resulting in poor electricity generation performance of the unit cell.

Such a problem is common with an electrolysis unit cell, which is a constitutive unit of a solid oxide electrolysis cell (hereinafter also referred to as a "SOEC") for generating hydrogen by utilizing the electrolysis of water. In the present specification, a fuel cell unit cell and an electrolysis unit cell are collectively referred to as an "electrochemical reaction unit cell." Such a problem is also common with electrochemical reaction unit cells other than a SOFC and a SOEC.

SUMMARY OF THE INVENTION

It is therefore an object of the present disclosure to provide a technique capable of solving the aforementioned problems.

The above object has been achieved by providing an electrochemical reaction unit cell (1) comprising an electrolyte layer containing Zr, an anode disposed on one side of the electrolyte layer in a first direction, a cathode containing Sr and disposed on another side of the electrolyte layer in the first direction, and a reaction preventing layer disposed between the electrolyte layer and the cathode, wherein the reaction preventing layer contains Zr in an amount of 0.015 (wt %) to 1 (wt %). According to the electrochemical reaction unit cell (1), since the reaction preventing layer contains Zr in an amount of 0.015 (wt %) or more, Sr diffused from the cathode toward the electrolyte layer can be trapped by Zr distributed in the reaction preventing layer. This can prevent diffusion of Sr into a region in the vicinity of the boundary between the reaction preventing layer and the electrolyte layer, and can prevent the performance of the electrochemical reaction unit cell from becoming impaired, which would otherwise occur due to generation of stratiform $SrZrO_3$ of high resistance in the region. Since the reaction preventing layer contains Zr in an amount of 1 (wt %) or less, excessive diffusion of an element (other than Sr) from the cathode can be prevented, thereby preventing a reduction in reliability, which would otherwise occur due to a variation in the composition of the cathode.

In a preferred embodiment (2) of the electrochemical reaction unit cell (1), the reaction preventing layer contains Zr in an amount of 0.18 (wt %) or less. According to the electrochemical reaction unit cell (2), since the reaction preventing layer contains Zr in an amount of 0.18 (wt %) or less, excessive diffusion of an element (other than Sr) from the cathode can be prevented even after initiating use of the unit cell. Consequently, a reduction in endurance reliability is prevented, which would otherwise occur due to a variation in the composition of the cathode after initiating use of the unit cell.

In another preferred embodiment (3) of the electrochemical reaction unit cell (1) or (2) above, the reaction preventing layer contains Zr in an amount of 0.05 (wt %) or more. According to the electrochemical reaction unit cell (3), since the reaction preventing layer contains Zr in an amount of 0.05 (wt %) or more, Sr diffused from the cathode toward the electrolyte layer can be effectively trapped by Zr distributed in the reaction preventing layer, thereby effectively preventing the performance of the electrochemical reaction unit cell from becoming impaired.

In yet another preferred embodiment (4) of the electrochemical reaction unit cell of any of (1) to (3) above, the reaction preventing layer contains Gd. According to the present electrochemical reaction unit cell, Gd contained in the reaction preventing layer can prevent diffusion of Sr toward the electrolyte layer, thereby effectively preventing the performance of the electrochemical reaction unit cell from becoming impaired.

In yet another preferred embodiment (5) of the electrochemical reaction unit cell of any of (1) to (4) above, the electrolyte layer contains a solid oxide. According to the electrochemical reaction unit cell (5), impairment of the performance of the unit cell, which would otherwise occur due to generation of $SrZrO_3$, can be prevented while preventing a reduction in the reliability of the cathode.

In yet another preferred embodiment (6), the electrochemical reaction unit cell of any of (1) to (5) above is a fuel cell unit cell. According to the electrochemical reaction unit cell (6), impairment of electricity generation performance can be prevented while preventing a reduction in the reliability of the cathode.

The technique disclosed in the present specification can be implemented in various modes; for example, an electrochemical reaction unit cell (fuel cell unit cell or electrolysis unit cell), an electrochemical reaction cell stack (fuel cell stack or electrolysis cell stack) including a plurality of electrochemical reaction unit cells such as those described in any one of (1) to (6) above, and a production method therefor.

DESCRIPTION OF REFERENCE NUMERALS

Figure 1:
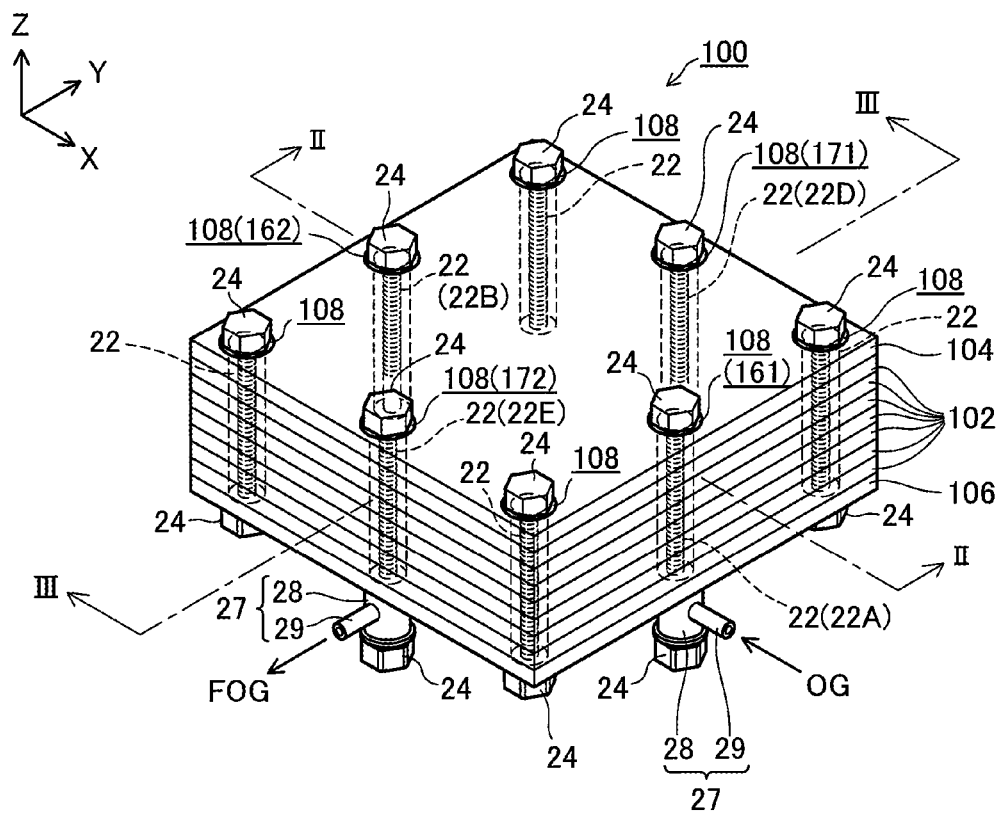
FIG. 1 is a perspective view showing the external appearance of a fuel cell stack 100 according to an embodiment of the present invention.

Reference numerals used to identify various features in the drawings include the following.

22: bolt, 24: nut; 26: insulation sheet; 27: gas passage member; 28: body portion; 29: branch portion; 100: fuel cell stack; 102: electricity generation unit; 104: end plate; 106: end plate; 108: communication hole; 110: unit cell; 112: electrolyte layer; 114: cathode; 116: anode; 120: separator; 121: hole; 124: bonding member; 130: cathode-side frame; 131: hole; 132: oxidizer gas supply communication hole; 133: oxidizer gas discharge communication hole; 134: cathode-side current collector; 135: current collector element; 140: anode-side frame; 141: hole; 142: fuel gas supply communication hole; 143: fuel gas discharge communication hole; 144: anode-side current collector; 145: electrode facing portion; 146: interconnector facing portion; 147: connection portion; 149: spacer; 150: interconnector; 161: oxidizer gas introduction manifold; 162: oxidizer gas discharge manifold; 166: cathode chamber. 171: fuel gas introduction manifold; 172: fuel gas discharge manifold; 176: anode chamber; 180: reaction preventing layer. 182: solid solution layer; 210: active layer; 220: current collecting layer. 810: interconnector; 820: fuel gas flow channel; 830: electrode support; 840: anode; 850: electrolyte layer; 860: cathode; 870: current collecting member, and 900: reaction preventing layer

DETAILED DESCRIPTION OF THE PREFERRED EMBODIMENTS

The invention will next be described in greater detail with reference to the drawings. However, the present invention should not be restricted as being limited thereto.

A. Embodiment

A-1. Structure:
(Structure of Fuel Cell Stack 100)

Figure 2:
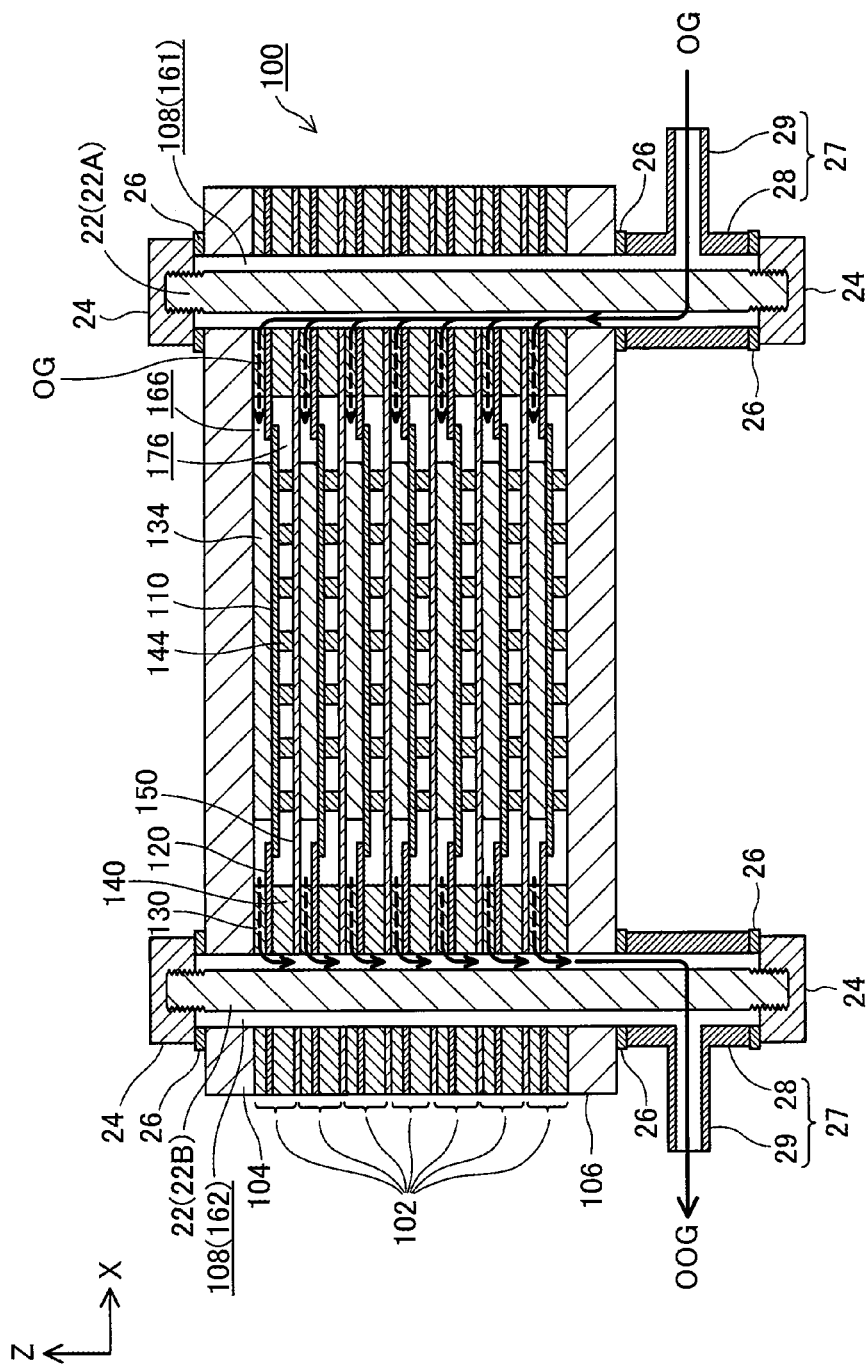
FIG. 2 is an explanatory view showing an XZ section of the fuel cell stack 100 taken along line II-II of FIG. 1.
Figure 3:
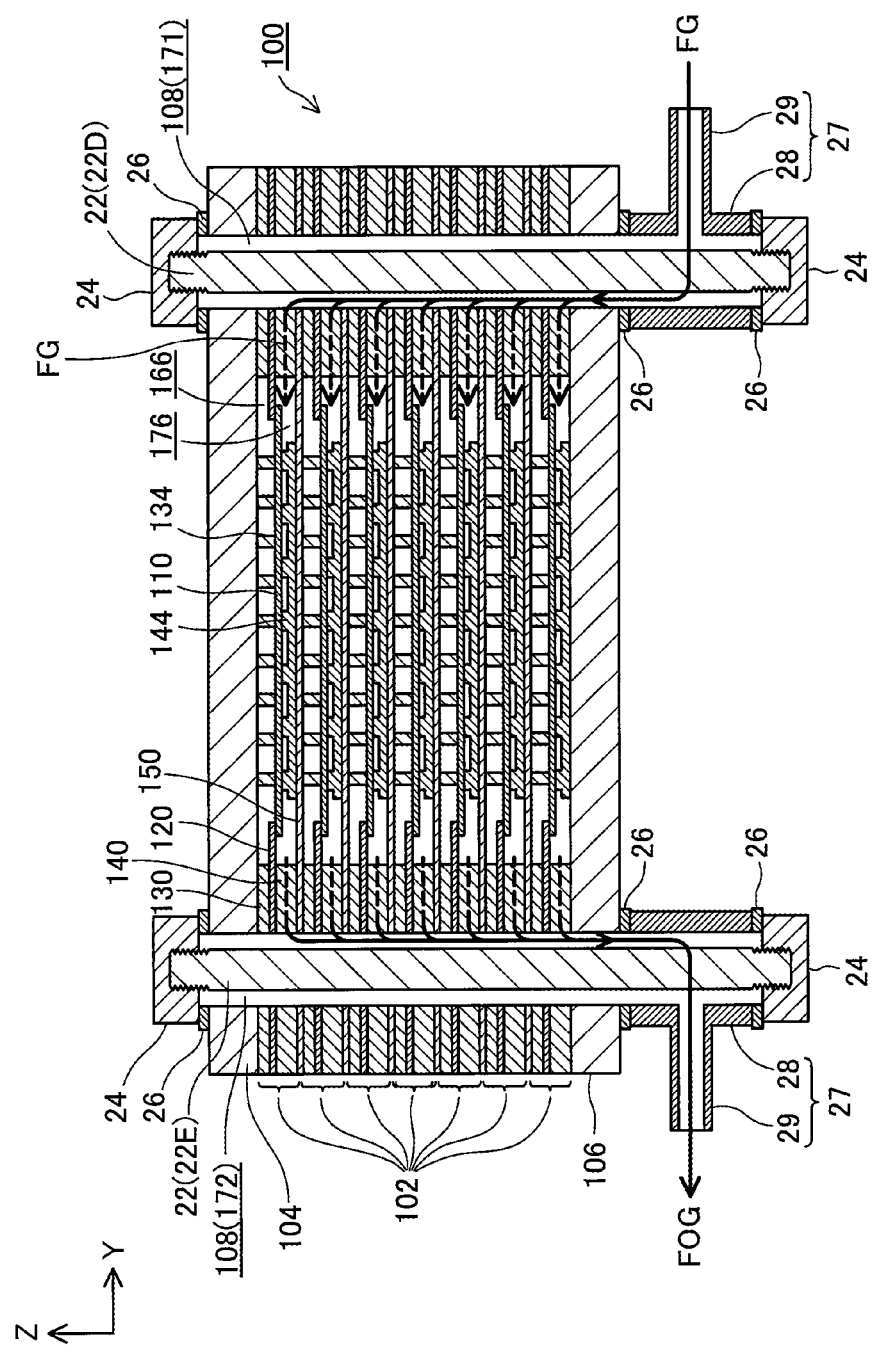
FIG. 3 is an explanatory view showing a YZ section of the fuel cell stack 100 taken along line III-III of FIG. 1.

FIG. 1 is a perspective view showing the external appearance of a fuel cell stack 100 according to an embodiment of the present invention; FIG. 2 is an explanatory view showing an XZ section of the fuel cell stack 100 taken along line II-II of FIG. 1; and FIG. 3 is an explanatory view showing a YZ section of the fuel cell stack 100 taken along line III-III of FIG. 1. FIGS. 1 to 3 show mutually orthogonal X-axis. Y-axis, and Z-axis for specifying orientation. In the present specification, the positive Z-axis direction is called the "upward direction" and the negative Z-axis direction is called the "downward direction"; however, in actuality, the fuel cell stack 100 may be disposed in a different orientation. The same also applies to FIG. 4 and subsequent drawings.

The fuel cell stack 100 includes a plurality of (seven in the present embodiment) of electricity generation units 102 and a pair of end plates 104 and 106. The seven electricity generation units 102 are disposed in a predetermined array direction (in the vertical direction in the present embodiment). A pair of the end plates 104 and 106 is disposed so as to hold an assembly of the seven electricity generation units 102 in the vertical direction. The array direction (vertical direction) corresponds to the first direction of the invention.

The fuel cell stack 100 has a plurality (eight in the present embodiment) of holes formed therein and extending in the vertical direction through peripheral portions about the Z-axis direction of its component layers (the electricity generation units 102 and the end plates 104 and 106). Also, the corresponding holes formed in the respective layers communicate with one another in the vertical direction, thereby forming communication holes 108 extending in the vertical direction from one end plate 104 to the other end plate 106. In the following description, individual holes which constitute each communication hole 108 and which are formed in the individual layers of the fuel cell stack 100 are referred to as the "communication holes 108."

Bolts 22 extending in the vertical direction are inserted into the corresponding communication holes 108, and the fuel cell stack 100 is fastened by means of the bolts 22 and nuts 24 engaged with opposite ends of the bolts 22. As shown in FIGS. 2 and 3, corresponding insulation sheets 26 intervene between the nuts 24 engaged with one of the ends (an upper end) of the bolts 22 and the upper surface of the end plate 104 serving as the upper end of the fuel cell stack 100 and between the nuts 24 engaged with one of the other ends (a lower end) of the bolts 22 and the lower surface of the end plate 106 serving as the lower end of the fuel cell stack 100. However, in each region where a gas passage member 27, which will be described below, is provided, the gas passage member 27 and the insulation sheets 26 disposed respectively on the upper end and on the lower end of the gas passage member 27 intervene between the nut 24 and the surface of the end plate 106. The insulation sheet 26 is formed of, for example, a mica sheet, a ceramic fiber sheet, a ceramic compact sheet, a glass sheet, or a glass ceramic composite material.

The outside diameter of a shaft portion of each bolt 22 is smaller than the inside diameter of each communication hole 108. Accordingly, a space exists between the outer circumferential surface of the shaft portion of each bolt 22 and the inner circumferential surface of each communication hole 108. As shown in FIGS. 1 and 2, a space defined by the bolt 22 (bolt 22A) located at around the midpoint of one side of the perimeter about the Z-axis direction of the fuel cell stack 100 (a side at the positive side in the X-axis direction of two sides in parallel with the Y-axis) and the communication hole 108 into which the bolt 22A is inserted functions as an oxidizer gas introduction manifold 161 into which oxidizer gas OG is introduced from outside the fuel cell stack 100 and which serves as a gas flow channel for supplying the oxidizer gas OG to the electricity generation units 102. On the other hand, a space defined by the bolt 22 (bolt 22B) located at around the midpoint of the side opposite the above side (a side at the negative side in the X-axis direction of two sides in parallel with the Y-axis) and the communication hole 108 into which the bolt 22B is inserted functions as an oxidizer gas discharge manifold 162 from which oxidizer offgas OOG discharged from the cathode chambers 166 of the electricity generation units 102 is discharged to the outside of the fuel cell stack 100. In the present embodiment, for example, air is used as the oxidizer gas OG.

As shown in FIGS. 1 and 3, a space defined by the bolt 22 (bolt 22D) located at around the midpoint of one side of the perimeter about the Z-axis direction of the fuel cell stack 100 (a side at the positive side in the Y-axis direction of two sides in parallel with the X-axis) and the communication hole 108 into which the bolt 22D is inserted functions as an fuel gas introduction manifold 171 into which fuel gas FG is introduced from outside the fuel cell stack 100 and which supplies the fuel gas FG to the electricity generation units 102. On the other hand, a space defined by the bolt 22 (bolt 22E) located at around the midpoint of the side opposite the above side (a side at the negative side in the Y-axis direction of two sides in parallel with the X-axis) and the communication hole 108 into which the bolt 22E is inserted functions as a fuel gas discharge manifold 172 from which fuel offgas FOG discharged from the anode chambers 176 of the electricity generation units 102 is discharged to the outside of the fuel cell stack 100. In the present embodiment, for example, hydrogen-rich gas reformed from city gas is used as the fuel gas FG.

The fuel cell stack 100 has four gas passage members 27. Each gas passage member 27 has a tubular body portion 28 and a tubular branch portion 29 branching from the side surface of the body portion 28. The hole of the branch portion 29 communicates with the hole of the body portion 28. A gas pipe (not shown) is connected to the branch portion 29 of each gas passage member 27. As shown in FIG. 2, the hole of the body portion 28 of the gas passage member 27 disposed at the position of the bolt 22A which partially defines the oxidizer gas introduction manifold 161 communicates with the oxidizer gas introduction manifold 161, whereas the hole of the body portion 28 of the gas passage member 27 disposed at the position of the bolt 22B which partially defines the oxidizer gas discharge manifold 162 communicates with the oxidizer gas discharge manifold 162. Also, as shown in FIG. 3, the hole of the body portion 28 of the gas passage member 27 disposed at the position of the bolt 22D which partially defines the fuel gas introduction manifold 171 communicates with the fuel gas introduction manifold 171, whereas the hole of the body portion 28 of the gas passage member 27 disposed at the position of the bolt 22E which partially defines the fuel gas discharge manifold 172 communicates with the fuel gas discharge manifold 172.

(Structure of End Plates 104 and 106)

The two end plates 104 and 106 are electrically conductive members each having an approximately rectangular flat-plate shape and are formed of, for example, stainless steel. One end plate 104 is disposed on the uppermost electricity generation unit 102, and the other end plate 106 is disposed under the lowermost electricity generation unit 102. A plurality of the electricity generation units 102 are held under pressure between the two end plates 104 and 106. The upper end plate 104 functions as a positive output terminal of the fuel cell stack 100, and the lower end plate 106 functions as a negative output terminal of the fuel cell stack 100.

(Structure of Electricity Generation Unit 102)

Figure 4:
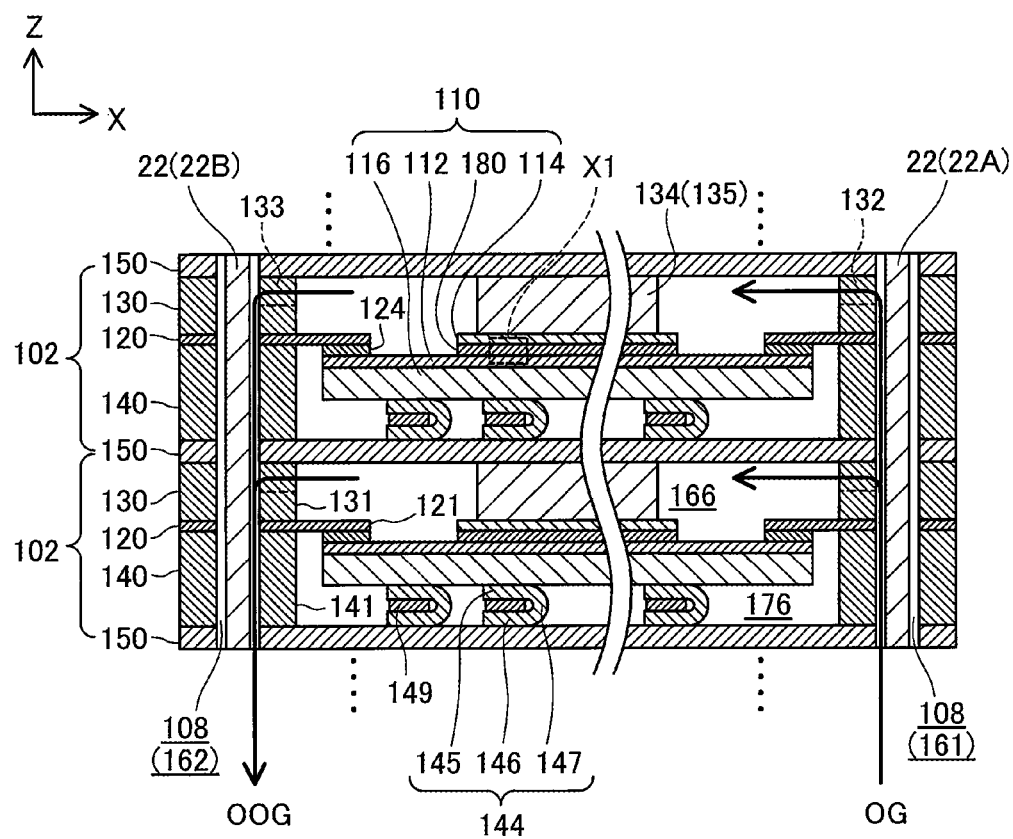
FIG. 4 is an explanatory view of the same XZ section as that of FIG. 2, showing two adjacent electricity generation units 102.
Figure 5:
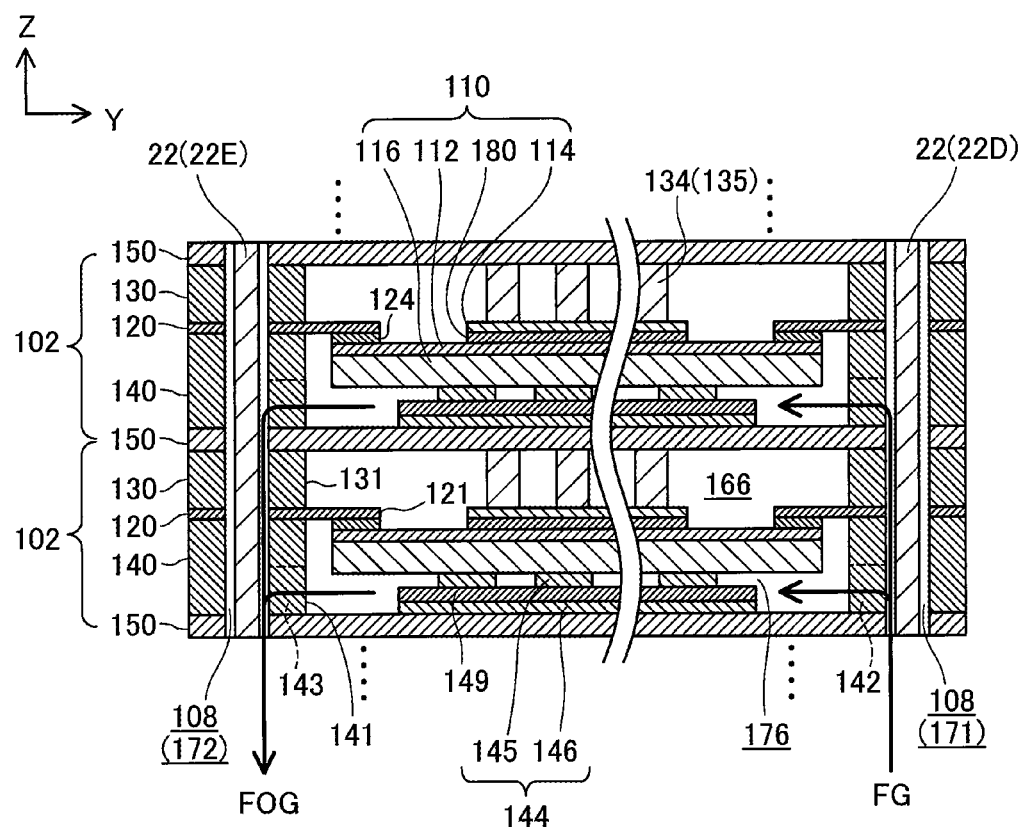
FIG. 5 is an explanatory view of the same YZ section as that of FIG. 3, showing two adjacent electricity generation units 102.

FIG. 4 is an explanatory view of the same XZ section as that of FIG. 2, showing two adjacent electricity generation units 102, and FIG. 5 is an explanatory view of the same YZ section as that of FIG. 3, showing two adjacent electricity generation units 102.

As shown in FIGS. 4 and 5, the electricity generation unit 102 includes a unit cell 110, a separator 120, a cathode-side frame 130, a cathode-side current collector 134, an anode-side frame 140, an anode-side current collector 144, and a pair of interconnectors 150 serving as the uppermost layer and the lowermost layer of the electricity generation unit 102. Holes corresponding to the communication holes 108 into which the bolts 22 are inserted are formed in peripheral portions about the Z-axis direction of the separator 120, the cathode-side frame 130, the anode-side frame 140, and the interconnectors 150.

The interconnector 150 is an electrically conductive member having an approximately rectangular flat plate shape and is formed of, for example, ferritic stainless steel. The interconnector 150 secures electrical conductivity between the electricity generation units 102 and prevents mixing of reaction gases between the electricity generation units 102. In the present embodiment, two electricity generation units 102 are disposed adjacent to each other, and the two adjacent electricity generation units 102 share one interconnector 150. That is, the upper interconnector 150 of a certain electricity generation unit 102 serves as a lower interconnector 150 of the upper adjacent electricity generation unit 102. Also, since the fuel cell stack 100 has the two end plates 104 and 106, the uppermost electricity generation unit 102 of the fuel cell stack 100 does not have the upper interconnector 150, and the lowermost electricity generation unit 102 does not have the lower interconnector 150 (see FIGS. 2 and 3).

The unit cell 110 includes an electrolyte layer 112, an anode 116 disposed on the lower side of the electrolyte layer 112, a cathode 114 disposed on the upper side of the electrolyte layer 112, and a reaction preventing layer 180 disposed between the electrolyte layer 112 and the cathode 114. The unit cell 110 of the present embodiment is an anode-support-type unit cell in which the anode 116 supports the other layers of the unit cell 110 (i.e., the electrolyte layer 112, the cathode 114, and the reaction preventing layer 180).

The electrolyte layer 112 is a member having an approximately rectangular flat-plate shape and contains YSZ (yttria-stabilized zirconia), which is a solid oxide. The cathode 114 is a member having an approximately rectangular flat-plate shape. In the present embodiment, the cathode 114 includes a current collecting layer 220, and an active layer 210 located on the lower side of the current collecting layer 220 (i.e., on the side toward the electrolyte layer 112) (see FIG. 6). The active layer 210 of the cathode 114 mainly functions as a site of ionization reaction of oxygen contained in the oxidizer gas OG. The active layer 210 contains LSCF (lanthanum strontium cobalt ferrite) and GDC (gadolinium-doped ceria) serving as an activation substance. The current collecting layer 220 of the cathode 114 mainly functions as a site of diffusing the oxidizer gas OG supplied from the cathode chamber 166 and collecting electricity obtained through an electricity generation reaction. The current collecting layer 220 contains LSCF. The anode 116 is a member having an approximately rectangular flat-plate shape and is formed of, for example, Ni (nickel), a cermet of Ni and ceramic powder, or an Ni-based alloy. Thus, the unit cell 110 of the present embodiment is a solid oxide fuel cell (SOFC) that contains a solid oxide as an electrolyte.

The reaction preventing layer 180 is a member having an approximately rectangular flat-plate shape and contains GDC (gadolinium-doped ceria). The reaction preventing layer 180 prevents generation of high resistance SZO due to reaction between Sr diffused from the cathode 114 and Zr contained in the electrolyte layer 112. The structure of a portion around the reaction preventing layer 180 in the unit cell 110 will be detailed below.

The separator 120 is a frame member which has an approximately rectangular hole 121 formed in a central region thereof and extending therethrough in the vertical direction, and is formed of, for example, a metal. A portion of the separator 120 around the hole 121 faces a peripheral portion of the surface on the cathode 114 side of the electrolyte layer 112. The separator 120 is bonded to the electrolyte layer 112 (unit cell 110) by means of a bonding member 124 formed of a brazing material (e.g., an Ag brazing material) and is disposed between a downward facing portion of the separator 120 and the electrolyte layer 112. The separator 120 separates the cathode chamber 166 which faces the cathode 114, and the anode chamber 176 which faces the anode 116, from each other, thereby preventing gas leakage from one electrode side to the other electrode side through a peripheral portion of the unit cell 110.

The cathode-side frame 130 is a frame member which has an approximately rectangular hole 131 formed in a central region thereof and extending therethrough in the vertical direction, and is formed of, for example, an insulator such as mica. The hole 131 of the cathode-side frame 130 partially constitutes the cathode chamber 166 which faces the cathode 114. The cathode-side frame 130 is in contact with a peripheral portion of the surface of the separator 120 on a side opposite the electrolyte layer 112 and with a peripheral portion of the surface of the interconnector 150 on a side toward the cathode 114. The cathode-side frame 130 electrically insulates the two interconnectors 150 included in the electricity generation unit 102 from each other. Also, the cathode-side frame 130 has an oxidizer gas supply communication hole 132 formed therein and adapted to establish communication between the oxidizer gas introduction manifold 161 and the cathode chamber 166, and an oxidizer gas discharge communication hole 133 formed therein and adapted to establish communication between the cathode chamber 166 and the oxidizer gas discharge manifold 162.

The anode-side frame 140 is a frame member which has an approximately rectangular hole 141 formed in a central region thereof and extending therethrough in the vertical direction, and is formed of, for example, a metal. The hole 141 of the anode-side frame 140 partially constitutes the anode chamber 176 which faces the anode 116. The anode-side frame 140 is in contact with a peripheral portion of the surface of the separator 120 on a side toward the electrolyte layer 112 and with a peripheral portion of the surface on a side of the interconnector 150 toward the anode 116. Also, the anode-side frame 140 has a fuel gas supply communication hole 142 formed therein and adapted to establish communication between the fuel gas introduction manifold 171 and the anode chamber 176, and a fuel gas discharge communication hole 143 formed therein and adapted to establish communication between the anode chamber 176 and the fuel gas discharge manifold 172.

The anode-side current collector 144 is disposed within the anode chamber 176. The anode-side current collector 144 includes an interconnector facing portion 146, an electrode facing portion 145, and a connection portion 147 which connects the electrode facing portion 145 and the interconnector facing portion 146 to each other, and is formed of, for example, nickel, a nickel alloy, or stainless steel. The electrode facing portion 145 is in contact with the surface on a side opposite the electrolyte layer 112 of the anode 116, and the interconnector facing portion 146 is in contact with the surface on a side toward the anode 116 of the interconnector 150. As described above, since the electricity generation unit 102 disposed at the lowermost position in the fuel cell stack 100 does not have the lower interconnector 150, the interconnector facing portion 146 in the lowermost electricity generation unit 102 is in contact with the lower end plate 106. Since the anode-side current collector 144 is thus configured, the anode-side current collector 144 electrically connects the anode 116 and the interconnector 150 (or the end plate 106) to each other. A spacer 149 formed of, for example, mica is disposed between the electrode facing portion 145 and the interconnector facing portion 146. Thus, the anode-side current collector 144 follows the deformation of the electricity generation unit 102 stemming from a temperature cycle and a pressure variation of reaction gas, thereby maintaining good electrical connection between the anode 116 and the interconnector 150 (or the end plate 106) via the anode-side current collector 144.

The cathode-side current collector 134 is disposed within the cathode chamber 166. The cathode-side current collector 134 is composed of a plurality of current collector elements 135 each having an approximately rectangular columnar shape and is formed of, for example, ferritic stainless steel. The cathode-side current collector 134 is in contact with the surface of the cathode 114 on a side opposite the electrolyte layer 112 and with the surface of the interconnector 150 on a side toward the cathode 114. As described above, since the electricity generation unit 102 disposed at the uppermost position in the fuel cell stack 100 does not have the upper interconnector 150, the cathode-side current collector 134 in the uppermost electricity generation unit 102 is in contact with the upper end plate 104. Since the cathode-side current collector 134 is thus configured, the cathode-side current collector 134 electrically connects the cathode 114 and the interconnector 150 (or the end plate 104) to each other. In the present embodiment, the cathode-side current collector 134 and the interconnector 150 are integrally formed as a unitary member. That is, a flat-plate-shape portion orthogonal to the vertical direction (Z-axis direction) of the unitary member functions as the interconnector 150, and a plurality of the current collector elements 135 protruding from the flat-plate-shape portion toward the cathode 114 collectively function as the cathode-side current collector 134. The unitary member composed of the cathode-side current collector 134 and the interconnector 150 may be covered with an electrically conductive coating. An electrically conductive bonding layer may be provided between the cathode 114 and the cathode-side current collector 134 for bonding of the cathode 114 to the cathode-side current collector 134.

A-2. Operation of Fuel Cell Stack 100:

As shown in FIGS. 2 and 4, when the oxidizer gas OG is supplied through a gas pipe (not shown) connected to the branch portion 29 of the gas passage member 27 provided at the position of the oxidizer gas introduction manifold 161, the oxidizer gas OG is supplied to the oxidizer gas introduction manifold 161 through the holes of the branch portion 29 and the body portion 28 of the gas passage member 27. The oxidizer gas OG is then supplied from the oxidizer gas introduction manifold 161 to the cathode chambers 166 through the oxidizer gas supply communication holes 132 of the electricity generation units 102. Also, as shown in FIGS. 3 and 5, when the fuel gas FG is supplied through a gas pipe (not shown) connected to the branch portion 29 of the gas passage member 27 provided at the position of the fuel gas introduction manifold 171, the fuel gas FG is supplied to the fuel gas introduction manifold 171 through the holes of the branch portion 29 and the body portion 28 of the gas passage member 27. The fuel gas FG is then supplied from the fuel gas introduction manifold 171 to the anode chambers 176 through the fuel gas supply communication holes 142 of the electricity generation units 102.

When the oxidizer gas OG is supplied to the cathode chamber 166 of each electricity generation unit 102 and the fuel gas FG is supplied to the anode chamber 176 of each electricity generation unit 102, the unit cell 110 generates electricity by the electrochemical reaction between the oxidizer gas OG and the fuel gas FG. The electricity generating reaction is an exothermic reaction. In each electricity generation unit 102, the cathode 114 of the unit cell 110 is electrically connected to one interconnector 150 through the cathode-side current collector 134, whereas the anode 116 is electrically connected to the other interconnector 150 through the anode-side current collector 144. Also, a plurality of the electricity generation units 102 contained in the fuel cell stack 100 are connected electrically in series. Accordingly, electric energy generated in the electricity generation units 102 is output from the end plates 104 and 106 which function as output terminals of the fuel cell stack 100. In the SOFC, since electricity is generated at a relatively high temperature (e.g., 700° C. to 1,000° C.), the fuel cell stack 100 may be heated by a heater (not shown) from startup until the high temperature can be maintained by means of heat generated as a result of generation of electricity.

As shown in FIGS. 2 and 4, the oxidizer offgas OOG discharged from the cathode chambers 166 of the electricity generation units 102 is discharged to the oxidizer gas discharge manifold 162 through the oxidizer gas discharge communication holes 133, passes through the holes of the body portion 28 and the branch portion 29 of the gas passage member 27 provided at the position of the oxidizer gas discharge manifold 162, and is then discharged to the outside of the fuel cell stack 100 through a gas pipe (not shown) connected to the branch portion 29. Also, as shown in FIGS. 3 and 5, the fuel offgas FOG discharged from the anode chambers 176 of the electricity generation units 102 is discharged to the fuel gas discharge manifold 172 through the fuel gas discharge communication holes 143, passes through the holes of the body portion 28 and the branch portion 29 of the gas passage member 27 provided at the position of the fuel gas discharge manifold 172, and is then discharged to the outside of the fuel cell stack 100 through a gas pipe (not shown) connected to the branch portion 29.

Figure 6:
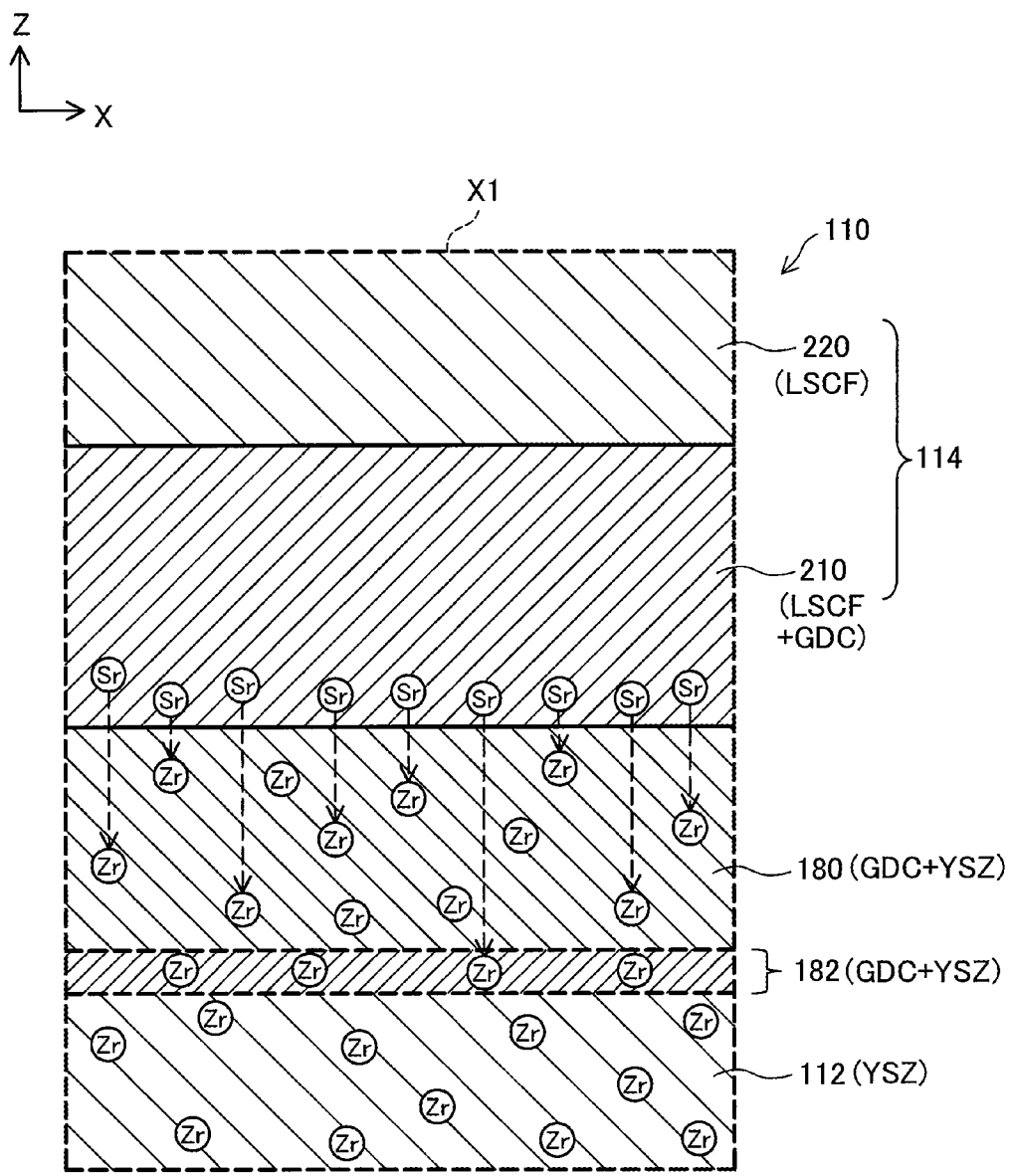
FIG. 6 is an explanatory view showing the specific structure of a portion around a reaction preventing layer 180 in a unit cell 110.

A-3. Specific Structure of Portion Around Reaction Preventing Layer 180 in Unit Cell 110:

FIG. 6 is an explanatory view showing the specific structure of a portion in the vicinity of the reaction preventing layer 180 in the unit cell 110. FIG. 6 illustrates an XZ section of the unit cell 110, which shows a region (region XI in FIG. 4) including a portion of the electrolyte layer 112 and a portion of the cathode 114 with the reaction preventing layer 180 intervening therebetween.

In the present embodiment, the unit cell 110 includes the reaction preventing layer 180 containing GDC, which is disposed between the active layer 210 of the cathode 114 containing LSCF and the electrolyte layer 112 containing YSZ. In the present embodiment, the reaction preventing layer 180 contains a predetermined amount of YSZ in addition to GDC. Thus, as schematically shown in FIG. 6, a predetermined amount of elemental Zr is distributed in the reaction preventing layer 180. A solid solution layer 182 generated through interdiffusion between the reaction preventing layer 180 and the electrolyte layer 112 is present around the boundary between the reaction preventing layer 180 and the electrolyte layer 112.

In the case where the reaction preventing layer 180 does not contain Zr, Sr diffused from the cathode 114 reaches a region around the boundary between the reaction preventing layer 180 and the electrolyte layer 112, and the diffused Sr reacts with Zr in the region. Consequently, stratiform SZO is generated in the region around the boundary between the reaction preventing layer 180 and the electrolyte layer 112 (i.e., the region around the solid solution layer 182). The generation of stratiform SZO increases electric resistance in the vertical direction, resulting in poor electricity generation performance of the unit cell 110. In contrast, in the unit cell 110 of the present embodiment, the reaction preventing layer 180 contains Zr, and thus Sr diffused from the cathode 114 toward the electrolyte layer 112 can be trapped by Zr distributed in the reaction preventing layer 180. Specifically, at least a portion of Sr diffused from the cathode 114 reacts with Zr distributed in the reaction preventing layer 180. In this case, SZO of high resistance is generated through reaction between Sr and Zr, but SZO generation sites are distributed in the reaction preventing layer 180. Thus, the unit cell 110 of the present embodiment can prevent Sr diffused from the cathode 114 from reaching the region around the boundary between the reaction preventing layer 180 and the electrolyte layer 112, thereby preventing the electricity generation performance of the unit cell 110 from becoming impaired, which would otherwise occur due to generation of stratiform SZO of high resistance in the region.

A-4. Performance Evaluation:

As described above, in the unit cell 110 of the present embodiment, the reaction preventing layer 180 contains Zr. Thus, impairment of the electricity generation performance of the unit cell 110 can be prevented. In order to determine an appropriate Zr content of the reaction preventing layer 180, plural samples of the unit cell 110 were prepared and used for performance evaluation. Table 1 below is an explanatory view showing the results of the performance evaluation. As shown in Table 1, the Zr content (wt %) of the reaction preventing layers 180 of the respective samples differ. Specifically, the Zr content (wt %) of the reaction preventing layers 180 in samples S1, S2, S3, S4, S5, S6 and S7 increases in this order.

then the viscosity of the mixture is adjusted, to thereby prepare a paste for the reaction preventing layer. The paste for the reaction preventing layer is applied, by means of screen printing, onto the surface of the electrolyte layer 112 of the aforementioned laminate (composed of the electrolyte layer 112 and the anode 116), followed by firing at, for example, 1,300° C. Thus, the reaction preventing layer 180 is formed to thereby prepare a laminate of the reaction preventing layer 180, the electrolyte layer 112, and the anode 116. During this firing, interdiffusion occurs between the reaction preventing layer 180 and the electrolyte layer 112, to thereby form the solid solution layer 182 around the boundary between the reaction preventing layer 180 and the electrolyte layer 112.

TABLE 1

| SAMPLE No. | Zr CONTENT OF REACTION PREVENTING LAYER 180 (WT %) | Sr/Gd INTENSITY RATIO AT FIRST REFERENCE POINT P1 (%) | COHESION OF Co, Fe | | DETERMINATION |
|---|---|---|---|---|---|
| | | | INITIAL STATE | AFTER CONTINUOUS ENERGIZATION | |
| S1 | 0.01 | 63 | ABSENCE | ABSENCE | CC |
| S2 | 0.015 | 43 | ABSENCE | ABSENCE | BB |
| S3 | 0.05 | 29 | ABSENCE | ABSENCE | AA |
| S4 | 0.18 | 14 | ABSENCE | ABSENCE | AA |
| S5 | 1 | 11 | ABSENCE | PRESENCE | BB |
| S6 | 1.8 | 9 | PRESENCE | PRESENCE | CC |
| S7 | 5 | 8 | PRESENCE | PRESENCE | CC |

A-4-1. Method for Producing Unit Cell 110:

Each sample of the unit cell 110 was produced by the method described below.

(Formation of Laminate of Electrolyte Layer 112 and Anode 116)

YSZ powder (BET specific surface area: 5 to 7 m$^2$/g) is mixed with a butyral resin, dioctyl phthalate (DOP) serving as a plasticizer, a dispersant, and a solvent mixture of toluene and ethanol by means of a ball mill, to thereby prepare a slurry. The resultant slurry is formed into a thin film by means of a doctor blade, to thereby prepare a green sheet for the electrolyte layer having a thickness of, for example, about 10 μm. NiO powder (BET specific surface area: 3 to 4 m$^2$/g) is weighed (55 parts by mass in terms of Ni) and mixed with YSZ powder (BET specific surface area: 5 to 7 m$^2$/g) (45 parts by mass), to thereby prepare a powder mixture. The powder mixture is mixed with a butyral resin, DOP serving as a plasticizer, a dispersant, and a solvent mixture of toluene and ethanol by means of a ball mill, to thereby prepare a slurry. The resultant slurry is formed into a thin film by means of a doctor blade, to thereby prepare a green sheet for the anode having a thickness of, for example, about 270 μm. The green sheet for electrolyte layer and the green sheet for anode are attached together and dried, followed by firing at, for example, 1,400° C., to thereby prepare a laminate of the electrolyte layer 112 and the anode 116.

(Formation of Reaction Preventing Layer 180)

YSZ powder (8YSZ, BET specific surface area: 14 m$^2$/g) (highly pure zirconia cobble, a predetermined amount for each sample) is added to GDC powder (Ce:Gd=8:2 (ratio by mole), BET specific surface area: 15 m$^2$/g), followed by dispersion mixing for 60 hours. The resultant powder mixture is mixed with poly(vinyl alcohol) serving as an organic binder and butyl carbitol serving as an organic solvent, and (Formation of Cathode 114)

LSCF powder, GDC powder, alumina powder, poly(vinyl alcohol) serving as an organic binder, and butyl carbitol serving as an organic solvent are mixed together, and the viscosity of the mixture is adjusted, to thereby prepare a paste for the cathode active layer. The paste for cathode active layer is applied, by means of screen printing, onto the surface of the reaction preventing layer 180 of the aforementioned laminate (composed of the reaction preventing layer 180, the electrolyte layer 112, and the anode 116) and then dried. LSCF powder, alumina powder, poly(vinyl alcohol) serving as an organic binder, and butyl carbitol serving as an organic solvent are mixed together, and the viscosity of the mixture is adjusted, to thereby prepare a paste for the cathode current collecting layer. The paste for the cathode current collecting layer is applied onto the paste for the cathode active layer by screen printing and then dried, followed by firing at, for example, 1,100° C. Thus, the active layer 210 and the current collecting layer 220 of the cathode 114 are formed. The unit cell 110 having the aforementioned structure is produced through the above-described process.

A-4-2. Evaluation Item and Evaluation Method:

The present performance evaluation involved examination of the diffusion of Sr and elements other than Sr (Co and Fe) from the cathode 114 toward the electrolyte layer 112.

(Method for Evaluation of Sr Diffusion)

A cross section (parallel to the Z-axis direction) of each sample of the unit cell 110 was analyzed by means of time-of-flight secondary ion mass spectrometry (TOF-SIMS). Specifically, intensity data of ZrO+, Gd+, Sr+, and CeO+ were obtained by means of TOF-SIMS under the following conditions.

Figure 7:
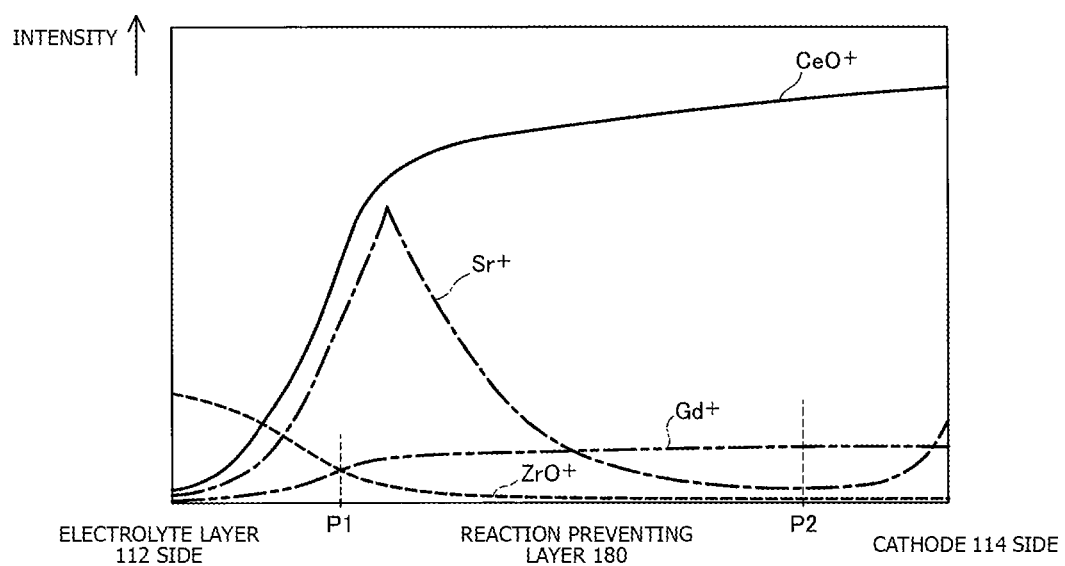
FIG. 7 is an explanatory view showing an example of intensity data obtained by means of TOF-SIMS.

Primary ion: Bi3++
Secondary ion polarity: positive
Measurement region: 20 μm×20 μm
Cumulative number: 16 cycles, 512 pixels FIG. 7 is an explanatory view showing an example of intensity data obtained by means of TOF-SIMS. As shown in FIG. 7, the intensity of ZrO+ is higher than that of Gd+ on the electrolyte layer 112 side, whereas the intensity of Gd+ is higher than that of ZrO+ on the reaction preventing layer 180 side.

In the present performance evaluation, two reference points (first reference point P1 and second reference point P2) were provided for adjusting the baseline of the samples. As shown in FIG. 7, the first reference point P1 is located at a position where a curve representing the intensity of ZrO+ intersects with a curve representing the intensity of Gd+. That is, the first reference point P1 is assumed to be present at a position around the boundary between the reaction preventing layer 180 and the electrolyte layer 112 (i.e., a position around the solid solution layer 182). The second reference point P2 is determined as follows. Measurement points are set at intervals of 0.2 μm from the first reference point P1 (start point) toward the cathode 114, and at each measurement point, the ratio of the intensity of ZrO+ to that of Gd+ (hereinafter referred to as "Zr/Gd intensity ratio") is calculated as an integer value. A set of three consecutive measurement points where the Zr/Gd intensity ratio first becomes the same among the three consecutive measurement points is determined, and one of the three consecutive measurement points which is the farthest from the first reference point P1 is used as the second reference point P2. That is, the second reference point P2 corresponds to a position at which the Zr/Gd intensity ratio is almost constant in the reaction preventing layer 180.

In each sample, the ratio of the intensity of Sr+ to that of Gd+ (hereinafter referred to as "Sr/Gd intensity ratio") was calculated at the first reference point P1. The Sr/Gd intensity ratio at the first reference point P1 indicates the degree of distribution of SZO of high resistance in a region around the boundary between the reaction preventing layer 180 and the electrolyte layer 112 (i.e., the degree of generation of stratiform SZO in the region). A high Sr/Gd intensity ratio at the first reference point P1 indicates that SZO is distributed in a wide area of the region around the boundary between the reaction preventing layer 180 and the electrolyte layer 112, and electric resistance is increased in the unit cell 110. In the present performance evaluation, a rating "CC" (fail) was given when the Sr/Gd intensity ratio was 50% or more at the first reference point P1.

Figure 8:
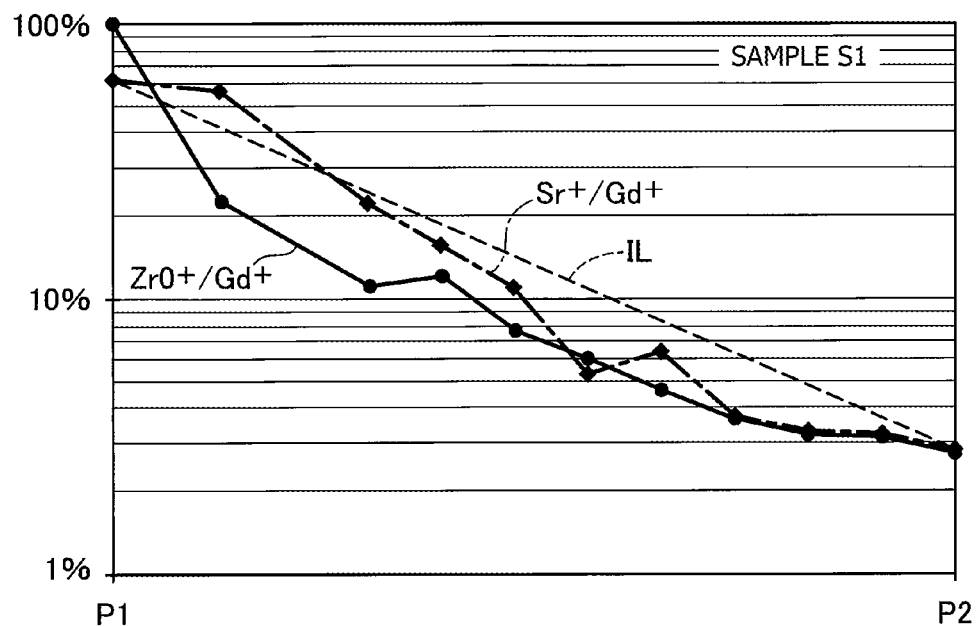
FIG. 8 is an explanatory view showing Sr/Gd intensity ratio and Zr/Gd intensity ratio in sample S1.
Figure 9:
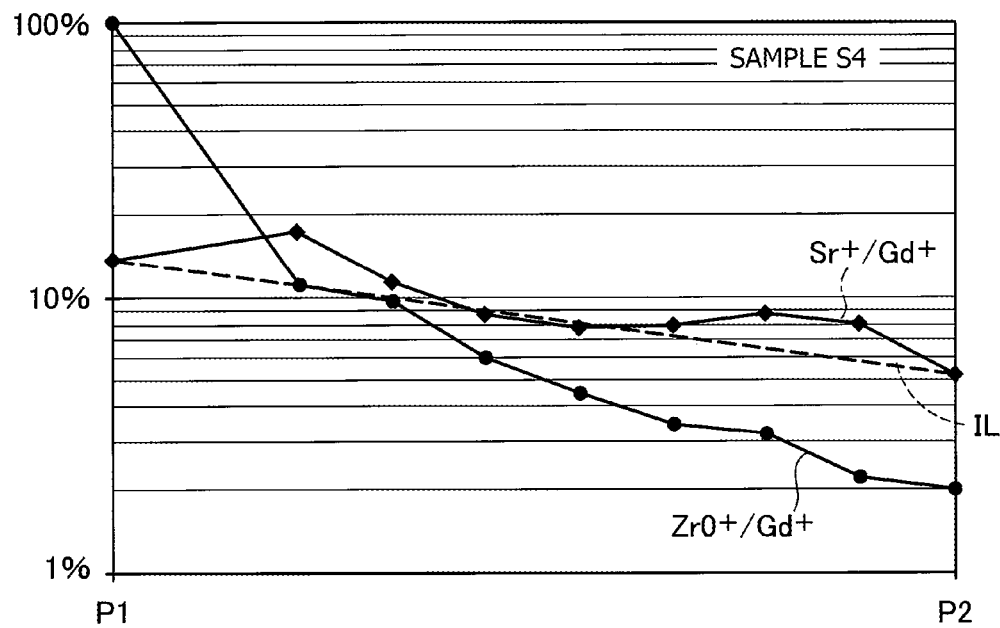
FIG. 9 is an explanatory view showing Sr/Gd intensity ratio and Zr/Gd intensity ratio in sample S4.

In the present performance evaluation, in each sample, the Sr/Gd intensity ratio was calculated at positions other than the first reference point P1. FIGS. 8 and 9 show the Sr/Gd intensity ratio (Sr+/Gd+) and the Zr/Gd intensity ratio (ZrO+/Gd+) in a region from the first reference point P1 to the second reference point P2 in samples S1 and S4, respectively. The present performance evaluation also involved examination of the absolute value of the gradient of an imaginary line IL connecting the Sr/Gd intensity ratio at the first reference point P1 and at the second reference point P2 (hereinafter the absolute value is also referred to as a "Sr/Gd intensity ratio gradient"). The Sr/Gd intensity ratio gradient indicates the degree of Sr diffusion from the cathode 114 toward the electrolyte layer 112. As shown in FIG. 8, a relatively large Sr/Gd intensity ratio gradient indicates diffusion of a large amount of Sr to a region near the first reference point P1. As shown in FIG. 9, a relatively small Sr/Gd intensity ratio gradient indicates trapping of Sr by Zr distributed in the reaction preventing layer 180; i.e., diffusion of a small amount of Sr to a region near the first reference point P1.

(Method for Evaluation of Diffusion of Elements Other than Sr (Co, Fe))

Each sample of the unit cell 110 was examined for the diffusion of Co and Fe from the cathode 114 toward the reaction preventing layer 180. Specifically, a cross section (parallel to the Z-axis direction) of each sample of the unit cell 110 was observed by means of TEM for determining the presence or absence of cohesion (segregation) of Co and Fe. If cohesion of Co or Fe was observed, the element was determined to having diffused into the reaction preventing layer 180. The diffusion of Co or Fe from the cathode 114 toward the reaction preventing layer 180 causes an undesirable reduction in reliability due to a variation in the composition of the cathode 114. Thus, a rating "CC" (fail) was given when the cohesion of Co or Fe was observed. In addition to the evaluation in the aforementioned initial state, the presence or absence of cohesion of Co and Fe was determined in a state after 1000-hour continuous energization (temperature: 700° C., current density: 0.55 A/cm$^2$, cathode-side atmosphere: oxygen (50 ml/min) and nitrogen (200 mL/min), anode-side atmosphere: hydrogen (320 mL/min), dew point: 30° C.) (hereinafter the above state is also referred to as "after continuous energization").

(Determination)

Based on the results of evaluation of the diffusion of Sr and elements other than Sr (Co, Fe), a rating of "CC" (fail) was given when the Sr/Gd intensity ratio was 50% or more at the first reference point P1 or the cohesion of Co or Fe was observed in an initial state, whereas a rating of "BB" (pass) was given when the Sr/Gd intensity ratio was less than 50% at the first reference point P1 and no cohesion of Co or Fe was observed in the initial state. A rating of "AA" (excellent) was given when the Sr/Gd intensity ratio was less than 30% at the first reference point P1 and no cohesion of Co or Fe was observed even after continuous energization.

(Results of Performance Evaluation)

As shown in Table 1, in the evaluation of Sr diffusion, sample S1 wherein the Zr content of the reaction preventing layer 180 was lowest (0.01 (wt %)) was given a rating of "CC" (fail). This is because the Sr/Gd intensity ratio was 50% or more at the first reference point P1. In sample S1, an insufficient amount of Zr was present in the reaction preventing layer 180. Thus, conceivably, a large amount of Sr that had diffused from the cathode 114 toward the electrolyte layer 112 was not trapped in the reaction preventing layer 180, and the untrapped SR then reached the first reference point P1; i.e., a position near the boundary between the reaction preventing layer 180 and the electrolyte layer 112. This is indicated by a relatively large Sr/Gd intensity ratio gradient in Sample S1 as shown in FIG. 8.

In samples S2 to S7 wherein the Zr content of the reaction preventing layer 180 was 0.015 (wt %) or more, the Sr/Gd intensity ratio was less than 50% at the first reference point P1. In these samples, a relatively large amount of Zr was distributed in the reaction preventing layer 180. Thus, conceivably, a large amount of Sr that had diffused from the cathode 114 toward the electrolyte layer 112 was trapped by Zr contained in the reaction preventing layer 180, and only a small amount of Sr reached the first reference point P1; i.e., a position near the boundary between the reaction preventing layer 180 and the electrolyte layer 112. This is indicated by, for example, a relatively small Sr/Gd intensity ratio gradient in Sample S4 as shown in FIG. 9. In samples S3 to S7 wherein the Zr content of the reaction preventing layer 180 was 0.05 (wt %) or more, the Sr/Gd intensity ratio was smaller and less than 30% at the first reference point P1. Thus, the Zr content of the reaction preventing layer 180 is more preferably 0.05 (wt %) or more.

In the evaluation of Co and Fe diffusion, samples S6 and S7 wherein the Zr content of the reaction preventing layer 180 was 1.8 (wt %) or more were given a rating of "CC" (fail), since the cohesion of Co or Fe was observed in the initial state. In samples S6 and S7, an excessively large amount of Zr was present in the reaction preventing layer 180, and thus, conceivably, promoted the diffusion of Co or Fe from the cathode 114.

In samples S1 to S5 wherein the Zr content of the reaction preventing layer 180 was 1 (wt %) or less, no cohesion of Co or Fe was observed in the initial state. In these samples, a relatively small amount of Zr was present in the reaction preventing layer 180, and thus, conceivably, the diffusion of Co or Fe from the cathode 114 was prevented. In sample S5 wherein the Zr content of the reaction preventing layer 180 was 1 (wt %), no cohesion of Co or Fe was observed in the initial state, but the cohesion of Co or Fe was observed after continuous operation. In contrast, in samples S1 to S4 wherein the Zr content of the reaction preventing layer 180 was 0.18 (wt %) or less, no cohesion of Co or Fe was observed in the initial state even after continuous operation. Thus, the Zr content of the reaction preventing layer 180 is more preferably 0.18 (wt %) or less.

As described above, sample S1 was given a rating of "CC" (fail), since the Sr/Gd intensity ratio was 50% or more at the first reference point P1. Samples S6 and S7 were given a rating of "CC" (fail), since cohesion of Co or Fe was observed in the initial state. In contrast, samples S2 to S5 were given a rating of "BB" (pass), since the Sr/Gd intensity ratio was less than 50% at the first reference point P1, and no cohesion of Co or Fe was observed in the initial state. Among samples S2 to S5, samples S3 and S4 were given a rating of "AA" (excellent), since the Sr/Gd intensity ratio was less than 30% at the first reference point P1, and no cohesion of Co or Fe was observed even after continuous energization.

In view of the aforementioned results of the performance evaluation, the Zr content of the reaction preventing layer 180 is preferably 0.015 (wt %) to 1 (wt %). This is because impairment of the electricity generation performance of the unit cell 110 can be prevented, while also preventing a reduction in reliability, which would otherwise occur due to a variation in the composition of the cathode 114. The Zr content of the reaction preventing layer 180 is more preferably 0.18 (wt %) or less, since a reduction in endurance reliability, which would otherwise occur due to a variation in the composition of the cathode 114, can be prevented even after initiating the use of the unit cell 110. The Zr content of the reaction preventing layer 180 is more preferably 0.05 (wt %) or more, since impairment of the electricity generation performance of the unit cell 110 can be effectively prevented.

The Zr content of the reaction preventing layer 180 in the unit cell 110 can be determined, for example, as described below. Firstly, the cathode 114 is scraped off from the unit cell 110 so that the reaction preventing layer 180 is exposed. Powder is scraped from the exposed reaction preventing layer 180. The scraped powder is analyzed by means of an ICP-AES apparatus, to thereby determine the Zr content of the reaction preventing layer 180. Alternatively, the Zr content of the reaction preventing layer 180 produced from the paste for the reaction preventing layer can be determined using a powder prepared by degreasing the paste and then analyzing the powder by means of an ICP-AES apparatus.

B. Modifications

The technique disclosed in the present specification is not limited to the above embodiment, but may be modified in various other forms without departing from the gist thereof. For example, the technique may be modified as described below.

In the above embodiment, the configuration of the unit cell 110 or the fuel cell stack 100 is a mere example, and may be modified into various forms. For example, in the above embodiment, the cathode 114 has a two-layer structure including the active layer 210 and the current collecting layer 220. However, the cathode 114 may include an additional layer besides the active layer 210 and the current collecting layer 220, or the cathode 114 may have a single-layer structure. In the above embodiment, the number of the unit cells 110 included in the fuel cell stack 100 is a mere example and is determined as appropriate in accordance with, for example, a required output voltage of the fuel cell stack 100.

In the above embodiment, materials used for forming the members are provided merely by way of example. Other materials may be used for forming the members. For example, in the above embodiment, the electrolyte layer 112 contains YSZ. So long as the electrolyte layer 112 contains Zr, the electrolyte layer 112 may contain, for example, a material such as ScSZ (scandia-stabilized zirconia) in place of or in addition to YSZ. In the above embodiment, the cathode 114 (the active layer 210 and the current collecting layer 220) contains LSCF. So long as the cathode 114 contains Sr, the cathode 114 may contain, for example, a material such as LSM (lanthanum strontium manganese oxide) in place of or in addition to LSCF. In the above embodiment, the reaction preventing layer 180 contains GDC and YSZ. The reaction preventing layer 180 may contain, for example, a material such as SDC (samarium-doped ceria) in place of or in addition to GDC, and may contain, for example, a material such as ScSZ in place of or in addition to YSZ.

In the above embodiment, the Zr content of the reaction preventing layer 180 does not necessarily fall within the aforementioned preferred range (e.g., 0.015 (wt %) to 1 (wt %)) in all the unit cells 110 included in the fuel cell stack 100. So long as the Zr content of the reaction preventing layer 180 falls within the aforementioned preferred range in at least one unit cell 110 included in the fuel cell stack 100, the electricity generation performance of the unit cell 110 can be prevented from becoming impaired while also preventing a reduction in reliability, which would otherwise occur due to a variation in the composition of the cathode 114.

Figure 10:
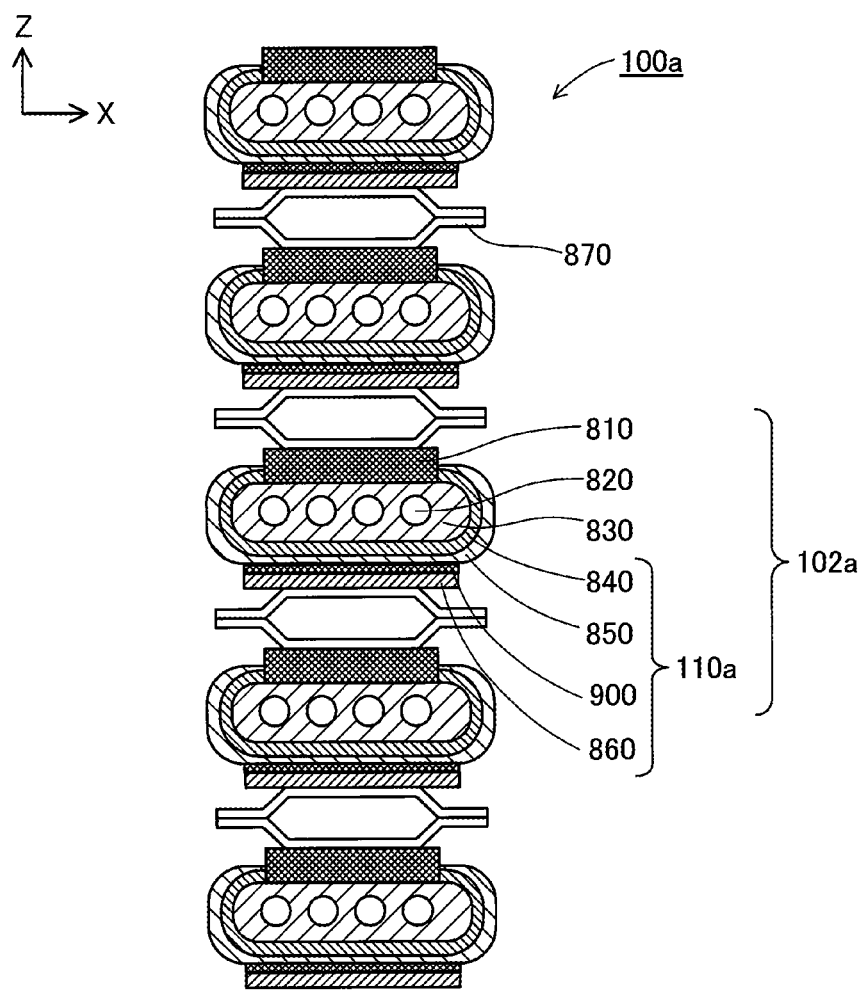
FIG. 10 is an explanatory view schematically showing the structure of a fuel cell stack 100a according to a modification.

In the above embodiment, the fuel cell stack 100 includes a plurality of unit cells 110 having a flat-plate shape. The present invention is also applicable to another configuration, for example, a fuel cell stack 100*a* including a plurality of approximately cylindrical unit cells 110*a* as disclosed in International Patent Publication WO 2012/165409. FIG. 10 is an explanatory view schematically showing the structure of a fuel cell stack 100*a* according to a modification. As shown in FIG. 10, the fuel cell stack 100*a* according to the modification includes a plurality of electricity generation units 102*a* disposed at predetermined intervals in the Z-axis direction. The electricity generation units 102*a* are connected electrically in series such that a current collecting member 870 intervenes between adjacent electricity generation units 102*a*. Each electricity generation unit 102*a* has a flattened columnar external appearance and includes an electrode support 830, a unit cell 110*a*, and an interconnector 810. The unit cell 110*a* includes an anode 840, an electrolyte layer 850, a cathode 860, and a reaction preventing layer 900. The Z-axis direction in the modification shown in FIG. 10 corresponds to the first direction appearing in the claims appended hereto.

The electrode support 830 is a columnar body having an approximately elliptical cross section and is formed of a porous material. The electrode support 830 has in the interior thereof a plurality of fuel gas flow channels 820 extending in the longitudinal direction of the columnar body. The anode 840 is disposed so as to cover one of the paired parallel flat surface portions of the electrode support 830 and two curved surface portions connecting the ends of the flat surface portions. The electrolyte layer 850 is disposed so as to cover the entire side surface of the anode 840. The cathode 860 is disposed so as to cover a region of the side surface of the electrolyte layer 850, namely, the region corresponding to the flat surface portion of the electrode support 830. The reaction preventing layer 900 is disposed between the electrolyte layer 850 and the cathode 860. The interconnector 810 is disposed on the flat surface portion of the electrode support 830 on which the anode 840 and the electrolyte layer 850 are not disposed. The current collecting member 870 electrically connects the cathode 860 of an electricity generation unit 102a to the interconnector 810 of the adjacent electricity generation unit 102a. An oxidizer gas is supplied to the outside of the cathode 860, and a fuel gas is supplied to the fuel gas flow channels 820 formed in the electrode support 830. Electricity is generated in the fuel cell stack 100a when it is heated to a predetermined operation temperature.

In the fuel cell stack 100a having the aforementioned configuration, if the Zr content of the reaction preventing layer 900 is adjusted to 0.015 (wt %) to 1 (wt %) in at least one unit cell 110a as in the case of the above embodiment, the performance of the unit cell 110a can be prevented from becoming impaired while preventing a reduction in reliability, which would otherwise occur due to a variation in the composition of the cathode 860.

The above embodiment refers to an SOFC for generating electricity by utilizing an electrochemical reaction between hydrogen contained in a fuel gas and oxygen contained in an oxidizer gas; however, the present invention is also applicable to an electrolysis unit cell which is a constituent unit of a solid oxide electrolysis cell (SOEC) for generating hydrogen by utilizing the electrolysis of water, and to an electrolysis cell stack including a plurality of electrolysis unit cells. Since the structure of the electrolysis cell stack is publicly known as described in, for example, Japanese Patent Application Laid-Open (kokai) No. 2016-81813, a detailed description of the structure is omitted. Schematically, the electrolysis cell stack has a structure similar to that of the fuel cell stack 100 in the above embodiment. That is, the fuel cell stack 100 in the above embodiment may be designated as an "electrolysis cell stack," the electricity generation unit 102 may be designated as an "electrolysis cell unit," and the unit cell 110 may be designated as an "electrolysis unit cell." However, in operation of the electrolysis cell stack, voltage is applied between the cathode 114 and the anode 116 such that the cathode 114 serves as a positive electrode, whereas the anode 116 serves as a negative electrode, and water vapor is supplied as a material gas through the communication hole 108. Thus, the electrolysis of water occurs in the electrolysis cell units, whereby hydrogen gas is generated in the anode chambers 176, and hydrogen is discharged to the outside of the electrolysis cell stack through the communication hole 108. In the electrolysis unit cell and the electrolysis cell stack having the aforementioned configuration, if a reaction preventing layer is disposed between the electrolyte layer and the cathode and the Zr content of the reaction preventing layer is adjusted to 0.015 (wt %) to 1 (wt %) as in the case of the above embodiment, the performance of the electrolysis unit cell can be prevented from becoming impaired while preventing a reduction in reliability, which would otherwise occur due to a variation in the composition of the cathode.

The above embodiment is described with reference to a solid oxide fuel cell (SOFC); however, the present invention is also applicable to other types of fuel cells (or electrolysis cells), such as a molten carbonate fuel cell (MCFC).

The invention claimed is:

1. An electrochemical reaction unit cell comprising:
an electrolyte layer containing Zr;
an anode disposed on one side of the electrolyte layer in a first direction;
a cathode containing Sr and disposed on another side of the electrolyte layer in the first direction; and
a reaction preventing layer containing Gd and disposed between the electrolyte layer and the cathode,
wherein the reaction preventing layer contains Zr in an amount of 0.015 wt % to 1 wt %,
a Sr/Gd intensity ratio is less than 50% at a first reference point around a boundary between the reaction preventing layer and the electrode layer, and
the first reference point is located at a position around the boundary where a curve representing intensity of ZrO intersects with a curve representing intensity of Gd on a graph of intensity data with respect to a plurality of positions aligned in the first direction around the boundary.

2. The electrochemical reaction unit cell as claimed in claim 1, wherein the reaction preventing layer contains Zr in an amount of 0.015 wt % to 0.18 wt %.

3. The electrochemical reaction unit cell as claimed in claim 1, wherein the reaction preventing layer contains Zr in an amount of 0.05 wt % to 1 wt %.

4. The electrochemical reaction unit cell as claimed in claim 1, wherein the electrolyte layer contains a solid oxide.

5. The electrochemical reaction unit cell as claimed in claim 1, wherein the electrochemical reaction unit cell is a fuel cell unit cell.

6. An electrochemical reaction cell stack comprising a plurality of electrochemical reaction unit cells including at least one electrochemical reaction unit cell as claimed in claim 1 disposed in the first direction.

* * * * *